March 27, 1951   E. R. TAYLOR   2,546,706
METHOD OF RAPID DRYING OF LUMBER AND OTHER MATERIALS
Filed Nov. 1, 1944
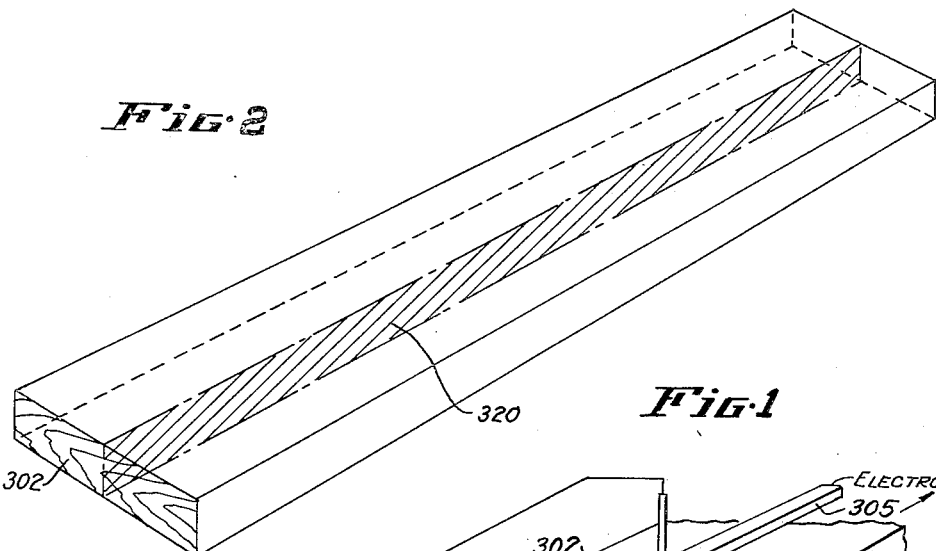
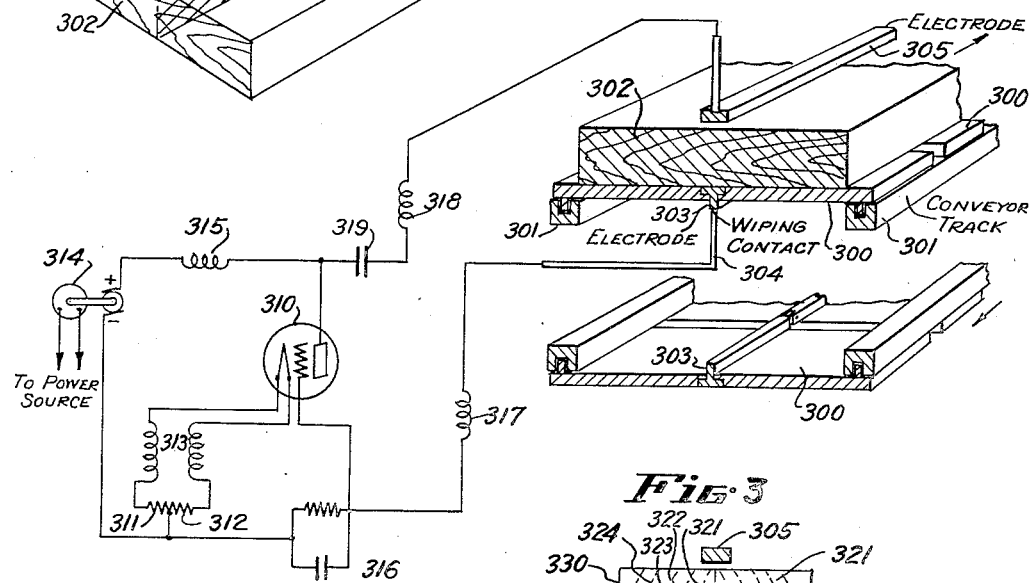
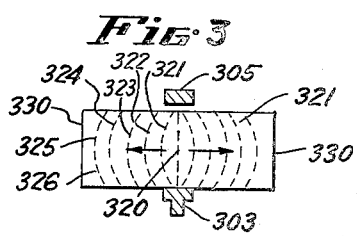
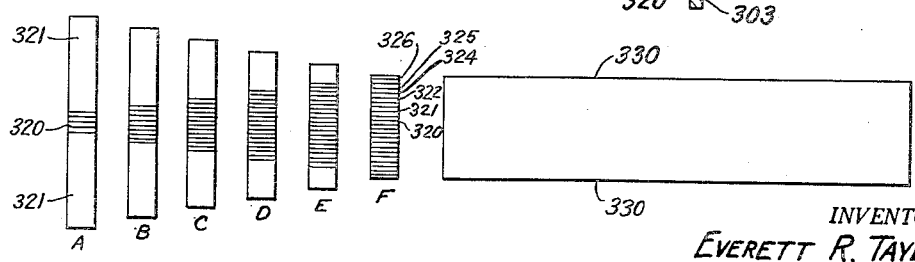
INVENTOR.
EVERETT R. TAYLOR
BY
*A. Dunham Owen*
ATTORNEY.

Patented Mar. 27, 1951

2,546,706

UNITED STATES PATENT OFFICE 2,546,706

METHOD OF RAPID DRYING OF LUMBER AND OTHER MATERIALS

Everett R. Taylor, Piedmont, Calif.

Application November 1, 1944, Serial No. 561,394

2 Claims. (Cl. 219—47)

My invention relates to improvements in methods for drying lumber.

One of the objects of my invention is to dry lumber in such a way as to avoid the condition called "case hardening."

Another object of my invention is to provide a method of drying lumber in a manner which will not cause it to check, split, twist or warp.

In passing from a condition of "dead green" to "dead dry" lumber can shrink as much as one-half inch per foot of width or thickness. From ordinary green lumber to reasonably dry lumber the shrinkage is usually at least one-quarter inch per foot.

When green lumber is delivered where there are rapid drying conditions, this green lumber will check, split, twist and warp and otherwise "fall down" in grade, making for a great deal of waste and a bad job. The use of green lumber in many building constructions makes for shrinkage problems resulting in bad appearing finished work, plaster cracks and the like. In spite of these problems and deficiencies most construction involves the use of relatively green lumber because dry lumber cannot be produced economically and without some of the defects mentioned above.

In the case of natural drying, that is, "sticking" and air drying, and in the case of kiln drying, the drying of the lumber takes place from the outside inward toward the center. The process in each case finds the outside of the lumber dried while the center of the piece remains somewhat moist and "green." Drying in this way means that internal stresses are set up in the piece and there is a tendency for the outside fibers to separate and be pulled apart to form surface cracks as they shrink around the green center core. This being the case it is quite obvious that checking and splitting of the outside parts of the piece will develop where the drying is rapid.

In the more rapid kiln drying a condition known as "case hardening" of the outer shell causes the fibers of the lumber to move slowly upon themselves and actually destroys the strength of the lumber by partially breaking down these fibers.

By my method I avoid the difficulties of these and other prior art processes and accomplish a drying of the lumber without any of the above undesirable results.

The method of my invention is to pass the stick through an electronic field which is directed from one side to the other through the longitudinal core of the board, and not through the whole width of the board. The effect of this is for this electronic field to heat the core and dry it out; then as the core becomes drier the resistance to the passage of current increases and in seeking a path of less resistance the heating current automatically spreads outwardly from the central core and dries the next adjacent areas. This continues until the whole board has been dried from the inside out. If the board is not too wide, this automatic spreading of the electronic field will take care of the drying.

Another way of stating my invention is to describe it as heating a small longitudinal area along the board while the other portions of the surface remain unheated and then progressively widening the zone of heat application as the moisture content in the exposed area drops.

Or, stated in still another way, my invention involves drying out a narrow longitudinal area while the balance of the board remains moist, and gradually extending the area being dried out until substantially the whole board has been dried to the desired degree.

In the present application I show apparatus useful in connection with this invention. As indicated in connection with the description of this apparatus, this method lends itself to a continuous process as well as to a process in which the lumber remains stationary and the exposure of successively wider longitudinal areas of the surface is accomplished by other means.

Therefore, in the description and illustration of my method and apparatus, it is not my intention that it be confined to practice with these described structures as they are merely illustrative, as required under Revised Statutes 4888.

In the drawings:

Fig. 1 is a fragmentary perspective view showing the features of a preferred form of electrical apparatus for practicing my method;

Fig. 2 is a view in perspective showing outlined in dot-dash lines and shade lines the core area which is the first part dried by my method; and Fig. 3 is a diagrammatic cross-sectional view through a board with the opposite electrodes in position and dotted lines indicating the drying progressively outwardly from the core;

Fig. 4 is an attempt to show diagrammatically what is meant by drying first a longitudinal core and then widening out from there until the whole board is dried. The proportions are exaggerated for purposes of illustration, and the drying probably is not on such definite lines as are used for illustration.

A preferred form of electric drying device is that shown diagrammatically in Fig. 1. Here there is an endless conveyor system having the connected supports 300 which run in the tracks 301 and carry the stick of lumber 302 through the machine. A lower electrode 303 is arranged in the supports 300 and is in contact with the wiping conductor 304. An upper electrode 305 is suspended above the stick of lumber 302. It may or may not be in direct contact with the lumber. When the electrodes are energized by an electronic device, as shown, direct contact is not needed for heating, as an electronic field is set up between the electrodes.

The particular form of high frequency generator utilized is not an important feature of the invention. If desired, a vacuum-tube oscillator such as is illustrated diagrammatically in Fig. 1 may be employed. It includes a three-element vacuum tube 310 which is arranged to generate high-frequency power at the desired frequency. The filament of the tube 310 is adapted to be energized by a transformer 311, the secondary side of which has an intermediate tap 312.

During the operation of the high-frequency generator the primary of the filament transformer 311 is excited from a suitable source of alternating current, thereby energizing the secondary of the filament transformer which supplies power to the filament or cathode of the oscillator tube 310. Radio frequency chokes 313 are introduced into either side of the filament supply in order to increase the efficiency of operation of the oscillator. The motor element of the motor generator set 314 is energized from a suitable power source and the generator supplies to the plate of the oscillator tube suitable high potential. The positive side of the generator is connected directly to the plate of the oscillator tube 310 through a radio frequency choke 315, and the negative side of the generator is connected to the filament cathode through the intermediate tap 312 in the secondary of the filament transformer and to the grid of the oscillator tube 310 through a parallel grid leak and condenser 316.

The oscillator circuit proper is a resonant circuit and includes the two spaced electrodes 303 and 305, one of which is connected to the grid of the oscillator tube through an inductance 317, and the other of which is connected to the plate of the oscillator tube through an inductance 318 and a capacitance 319. The frequency of oscillation of the tube circuit may be varied by varying the spacing of the electrodes 303 and 305, the impedance of the inductances 317 and 318 and the condenser 319, or either of them. The circuit is substantially the same as the conventional radio oscillator circuit and operates in a similar manner.

Figs. 2 and 3 illustrate probably as well as can be done, the result on a stick of lumber passed through the field between the electrodes 303 and 305. The effect is for this electronic field to heat the core 320 and dry it out, then as the core becomes drier the resistance to the passage of current increases, and in seeking a path of less resistance the heating current automatically spreads outwardly from the drier central core 320 and dries the next adjacent areas 321. This continues progressively through areas 322, 323, 324, 325, 326, etc., until the whole board has been dried from the inside 320 out. If the stick 302 is not too wide, this automatic spreading of the electronic field will take care of the drying.

In Fig. 4 I have attempted to show how the successive drying from the inside core outwardly causes the board to narrow.

As the narrow strip 320 approaches the desired moisture content, the heat-applying means is widened so that it takes in a portion of the adjacent moist sections 321 and dries these portions until they have the desired moisture content. This proceeds through the various sketches A, B, C, D, E and F as shown in exaggerated form in Fig. 4, until the original dried lengthwise core through the board has been enlarged to take in all the moist areas 321, 322, 324, 325, 326. The result lengthwise is a straight and true piece, not only as a finished product, but during all steps in the drying the edges 330 will be substantially parallel. At no time during the drying has the drying medium been applied to the board in an area which must subsequently in the drying process change materially in dimension or shape.

Other forms of apparatus may be used to practice my method and I desire to claim it as broadly as possible, without restriction to the particular apparatus employed.

What I claim is:

1. The method of drying a solid stick of lumber which includes using said stick as a dielectric in an electrical condenser and sending alternating current therethrough in a substantially planar vertical section along the length of said stick and in a direction approximately parallel to the grain thereof so as to heat first a very narrow vertical and longitudinal strip through said stick; then as said initial strip dries and its dielectric properties are thereby changed, to heat an immediately adjacent incremental strip; and to continue heating next adjacent incremental strips as one dries until the entire stick is dried.

2. The method of drying a solid stick of lumber which includes using said stick as a dielectric in an electrical condenser and sending radio frequency alternating current therethrough in a substantially planar vertical, central section from side to side along the length of said stick and in a direction approximately parallel to the grain thereof so as to heat first a very narrow vertical and longitudinal strip through said stick; then as said central strip dries and its dielectric properties are thereby changed, to heat the immediately adjacent incremental strips on both sides of said central strip, and to continue heating next adjacent incremental strips as one dries until the entire stick is dried.

EVERETT R. TAYLOR.

REFERENCES CITED

The following references are of record in the file of this patent:

UNITED STATES PATENTS

| Number | Name | Date |
|---|---|---|
| Re. 8,633 | Urmston | Mar. 25, 1879 |
| 932,802 | Morrill | Aug. 31, 1909 |
| 1,134,247 | Vogt | Apr. 6, 1915 |
| 1,146,212 | Sullivan | July 13, 1915 |
| 1,668,314 | Harvey | May 1, 1928 |
| 1,730,629 | Rule | Oct. 8, 1929 |
| 1,764,777 | Broughton | June 17, 1930 |
| 2,231,457 | Stephen | Feb. 11, 1941 |
| 2,317,281 | Linquist | Apr. 20, 1943 |
| 2,320,474 | Ross | June 1, 1943 |
| 2,408,434 | Mann et al. | Oct. 1, 1946 |
| 2,423,902 | Peterson | July 15, 1947 |

FOREIGN PATENTS

| Number | Country | Date |
|---|---|---|
| 104,868 | Austria | Aug. 17, 1938 |